United States Patent [19]

Bidell et al.

[11] Patent Number: 4,636,583
[45] Date of Patent: Jan. 13, 1987

[54] SYNCHRONIZATION OF LONG CODES OF BOUNDED TIME UNCERTAINTY

[75] Inventors: Frederick W. Bidell, Grand Island; Harold C. Kluever, Williamsville, both of N.Y.; Roger R. Reed, Arlington, Mass.

[73] Assignee: The United States of America as represented by the Secretary of the Navy, Washington, D.C.

[21] Appl. No.: 48,780

[22] Filed: Jun. 24, 1970

[51] Int. Cl.[4] .......................... H04L 9/00; H04L 7/00
[52] U.S. Cl. ............................. 178/22.17; 178/22.09; 178/22.19; 375/114
[58] Field of Search .................... 325/32, 58, 341; 178/69.5 R, 69.5 DC, 69.5 G, 22.09, 22.17, 22.19; 343/6.8 LC, 6.8 R; 375/114, 93, 2.1

[56] References Cited

U.S. PATENT DOCUMENTS

| | | | |
|---|---|---|---|
| 3,092,830 | 6/1963 | Clock et al. | 343/6.8 R |
| 3,305,636 | 2/1967 | Webb et al. | 178/69.5 R |
| 3,341,845 | 9/1967 | Deman | 343/6.5 LC |
| 3,447,085 | 5/1969 | De Haas et al. | 325/58 X |
| 3,524,201 | 8/1970 | Land, Jr. | 343/6.8 R |
| 3,575,554 | 4/1971 | Schmidt | 178/69.5 R |
| 3,639,838 | 2/1972 | Kuhn et al. | 375/116 X |
| 3,651,263 | 3/1972 | Lindback et al. | 375/114 |

Primary Examiner—Thomas H. Tarcza
Assistant Examiner—Linda J. Wallace
Attorney, Agent, or Firm—Robert F. Beers; Robert W. Adams

[57] ABSTRACT

Apparatus and method for synchronizing two code streams in a digital communication network. A locally generated code stream is stored in a precessing delay line and correlated with a received code stream using both static and dynamic techniques.

3 Claims, 7 Drawing Figures

SYNCHRONIZATION OF LONG CODES OF BOUNDED TIME UNCERTAINTY

BACKGROUND OF THE INVENTION

The invention is in the field of communications systems, particularly digital communication systems wherein pseudo random codes are employed. In the prior art difficulty has been encountered in synchronizing a locally generated code at one station with an information bearing code received from another station. Synchronization of the two codes is a necessary operation in the information retrieval process. Prior art systems including, for example, magnetic core matrices or long shift registers operating in real time, have been complex and expensive. Applicants have solved the synchronizing problem of the prior art by providing a novel synchronizing apparatus and method which are simple, reliable, and effective.

SUMMARY OF THE INVENTION

The invention comprises apparatus and method for synchronizing two code streams. A selected number of bits from a locally generated code stream are stored in a precessing delay line memory and tracked by an address storage resister driven at the precessing rate. A coincidence detector reads a selected bit out of the memory when the current address in the address storage register matches an address preset into an address selector. The address preset into the address selector may be derived from a received code. The bits read out of the precessing delay line memory are reclocked into real time. Means for both static and dynamic correlation of two code streams are provided to obtain synchronization.

DESCRIPTION OF THE PREFERRED EMBODIMENTS

This invention deals with communications systems and networks wherein coded signals are employed in the transmission and reception of information. One example of a communications network where the invention can be used is a network consisting of several terminals each adapted to receive information transmitted by another station.

Figure 1:
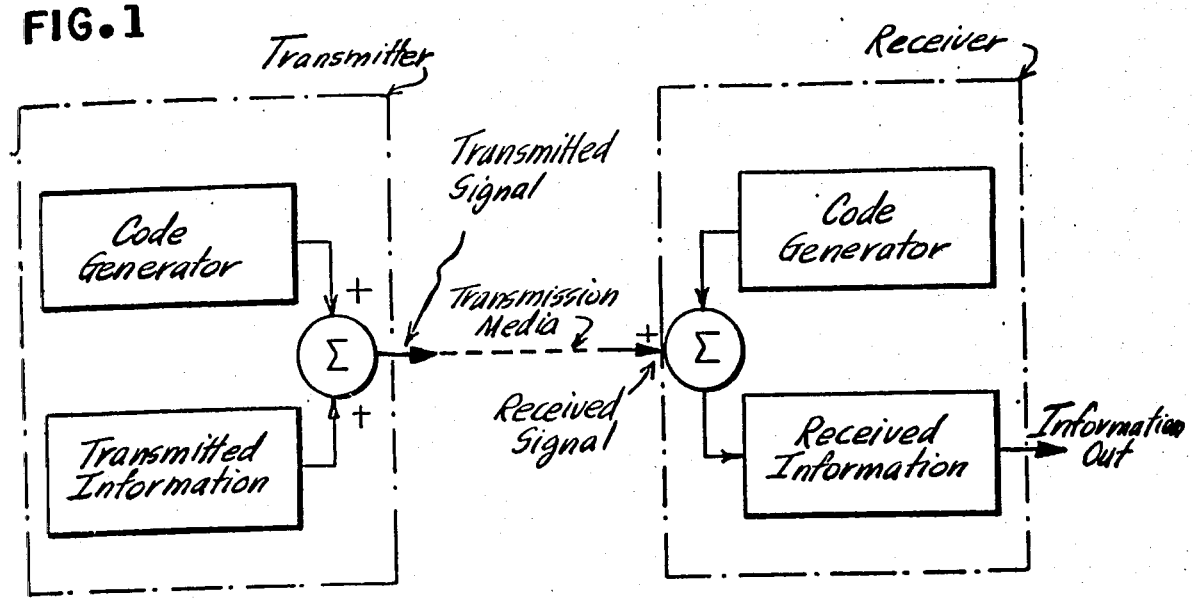
FIG. 1 shows a typical communications link of the prior art.

The following definitions will be used in the description of the invention:

Clock refers to a timing device located at each terminal which is used to generate a continuous pulse stream which in turn is used to drive a master code generator. The clock could typically be a precision crystal oscillator and pulse-forming network. Transmitter refers to one end or terminal of a communications link wherein information or traffic is originated and sent to the other end of the communications link. Receiver refers to the other end or terminal of the communications link which receives the information or traffic sent to it from the transmitter. FIG. 1 shows a typical communications link including a transmitter and a receiver. Code or code stream refers to a sequence of events such as a binary code consisting of a series of "ones" and "zeros" occurring in a pseudo-random but deterministic manner. Master code generator or code generator is a device which generates a master code stream. One master code generator is located at each terminal of the communications link. Locally generated code refers to a particular master code stream processed at the site or terminal under discussion. Transmitted code refers to the code being sent by the transmitter. Received code refers to the code stream being received at the site under discussion from some other site in the net which is identical to the transmitted code except for time delay, such as propagation delay time. The master code streams are generated at each terminal, or started simultaneously, in approximate time synchronism at all terminals in a net, using techniques known to the art.

As shown in the block diagram of FIG. 1, coding is added to transmitted information at a summing circuit connected between a "transmitted information" block and a "code generator" block at a transmitter. Coding is added for various reasons, for example, privacy. It is necessary to decode the composite received signal of information and coding at the receiving site to recover the original transmitted information. This decoding is accomplished using a type of demodulation known as correlation detection, wherein an exact replica of the transmitted code is generated at the receiver in time synchronism and mixed with the received signal. This causes the coding to be removed and thus permits recovery of the transmitted information. FIG. 1 shows a summing circuit connected to subtract the signal output of a code generator from the received composite signal to obtain the information signal.

If the codes at both transmitter and receiver sites of fixed separation can be started simultaneously and caused to remain in absolute time synchronism, correlation of the two signals will always take place at the receiver (when compensation is made for the delay of the transmitted signal due to propagation to the receiver site). However, in a situation where the distance between the transmitter and receiver varies (and thus the propagation delay time varies) in an unpredictable manner, or in a situation where the clock operating the transmitter code generator is not locked in frequency to the clock operating the receiver code generator, a time difference may exist between the received code and the locally generated code.

A problem continually arises in communication systems wherein a number of subscribers or terminals in a net are required to search and synchronize their locally generated code with a received code. When long pseudo-random codes are used, the receiver search time domain for correlation is bounded by the time uncertainty ($T_w$) between the locally generated and received codes which is generally attributed to uncertainty at time of intial synchronization, differential drift of the clocks, and possibly propagation delay. Thus, the maximum code time to be searched is a period defined as $\pm T_w$ or $2 T_w$ (i.e., a "window" or bounded domain of time uncertainty). The invention comprises apparatus and technique for effecting this search as well as maintaining code synchronization after initial synchronization. The code search and synchronization is achieved using novel means for storing and accessing the locally generated master code stream.

A prior suggested method requires the use of a magnetic core matrix for storage. This requires that the cores be operated in a shifting mode. Although this type of storage can be implemented, it is more complex than the apparatus of the invention.

A second prior art technique uses a long shift register operating in real time. This technique has the disadvantage of requiring many register elements and a prohibitively large matrix for accessing the various register elements.

Figure 2:
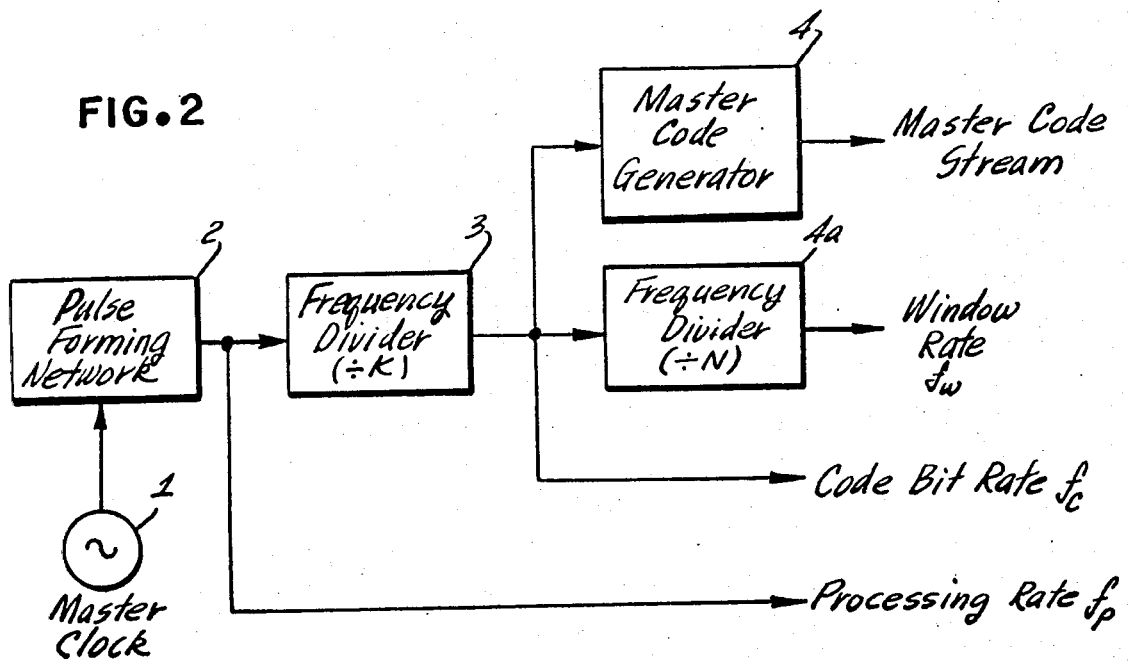
FIG. 2 shows a clocking system and a master code generator used in the invention.
Figure 3:
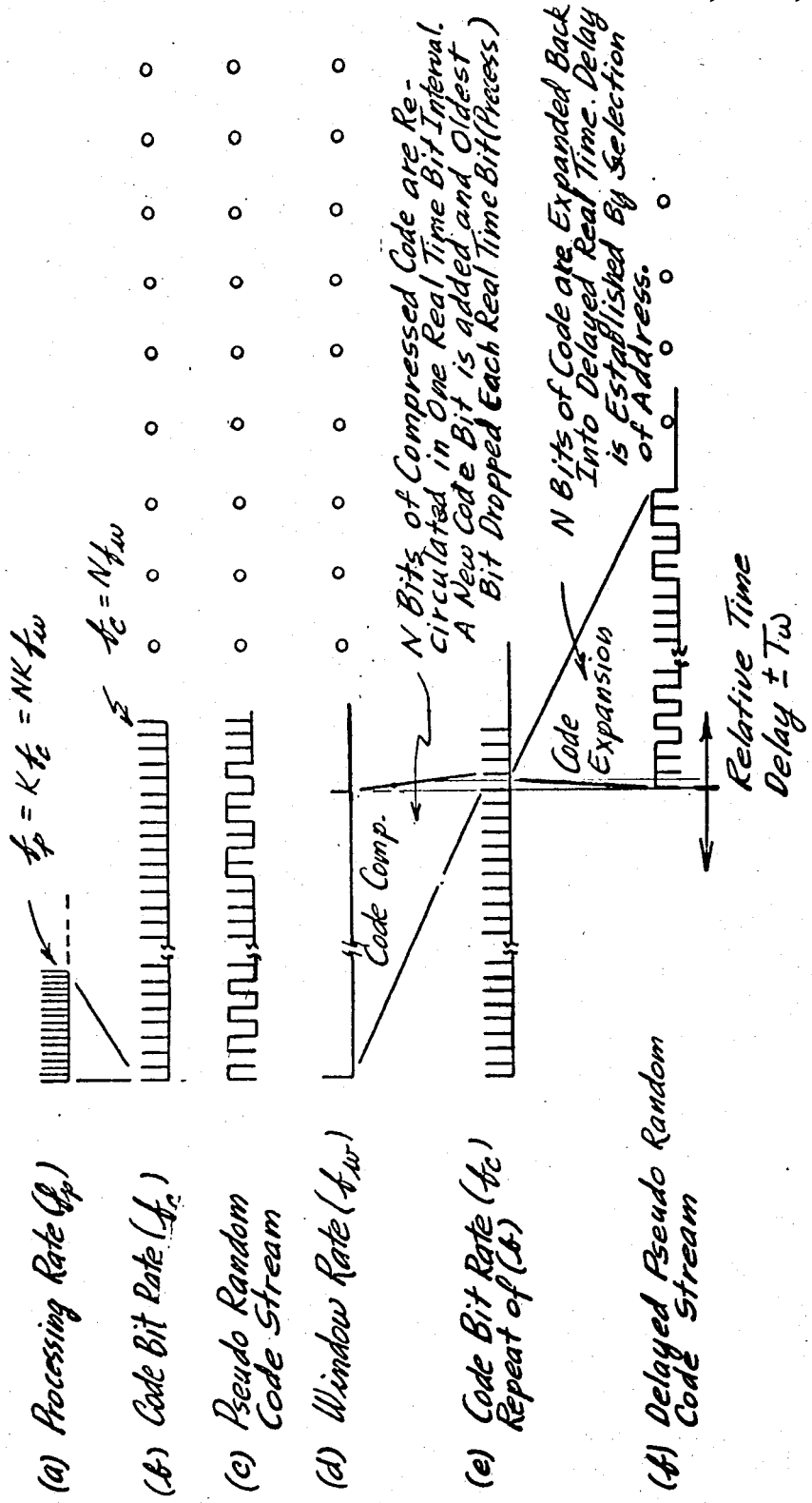
FIG. 3 is a timing diagram of the frequencies generated by the clocking system of FIG. 2.

FIG. 2 shows a block diagram of apparatus and FIG. 3 shows a timing diagram of pulse frequencies used for generating a master code stream and associated master timing rates. An oscillator or clock 1 of suitable stability provides a master frequency source or clock rate. The signal is shaped in a pulse forming network 2 to produce a processing rate ($f_p$) which is further divided by a second frequency divider 3 to provide a code bit rate ($f_c$). The processing rate must be an integral multiple of K times the code bit rate to achieve an integral number of recirculations of a compressed code stream (discussed later) in one bit period. The code bit rate is used to drive a master code generator 4 which generates a suitable pseudo-random code sequence, and a frequency divider 4a which produces pulses at 1/Nth of the code bit rate, where N is an integer chosen so that $N(1/f_c)=2T_w$. Provisions are made for synchronous initial start of the code generator 4 and the frequency divider 4a. This start-up is established synchronously with start-up of other units in the communications net in a manner known in the art. The output of 4a is a pulse rate $f_w$ which provides predictable interval markers or "commas" in the code stream (i.e., points of reference in the code stream at all sites). The rate $f_w$ will be referred to as the "window" rate.

Figure 4:
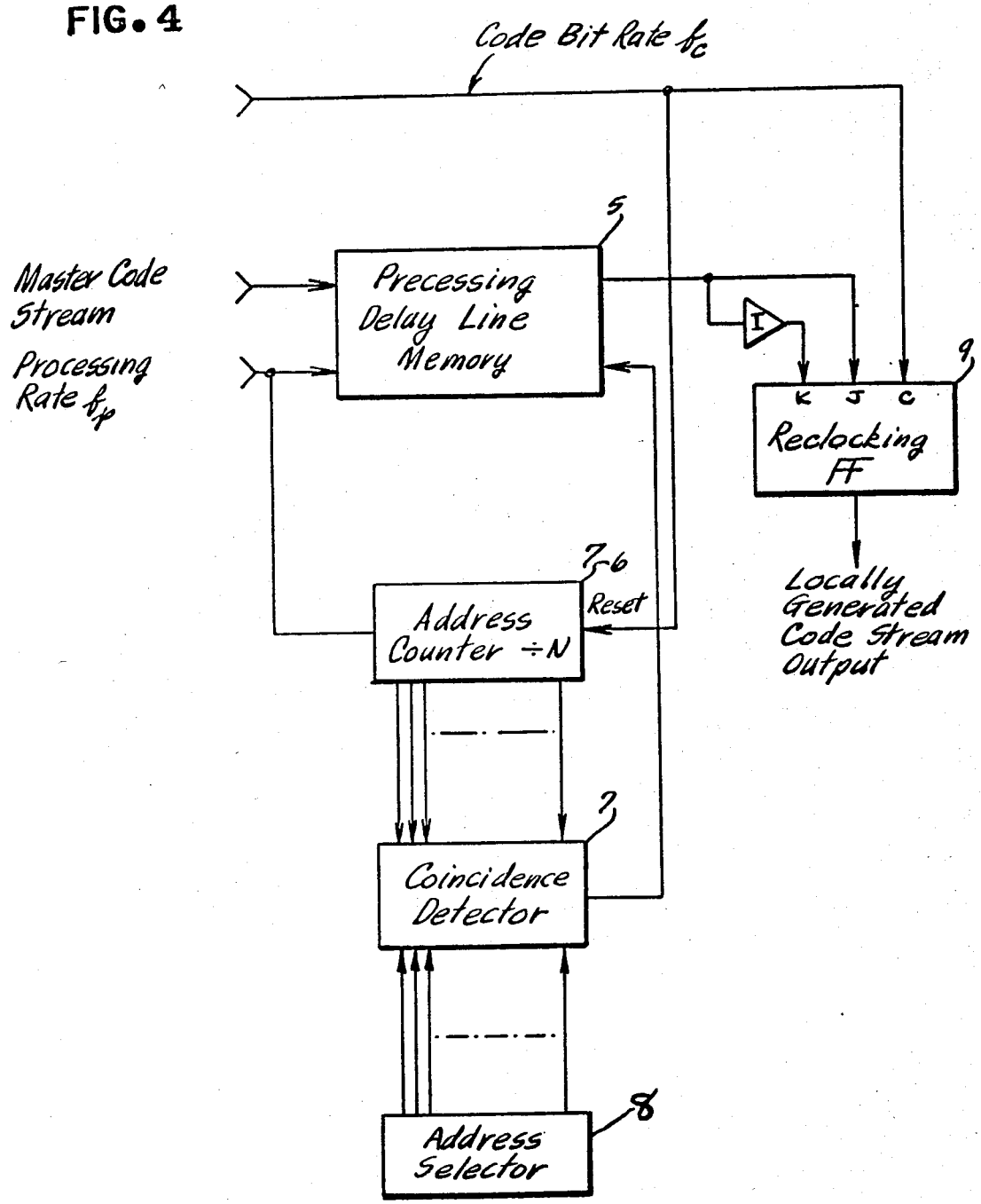
FIG. 4 shows a precessing delay line memory and auxiliary elements used in the invention.

In the apparatus of FIG. 4, precessing, which is a known art, is achieved by using a recirculating delay line with a time delay equal to N−1 bits and inserting a new code bit into the delay line on each recirculation. N bits of the master code are stored in a precessing delay line memory 5 wherein the code bits are compressed in time (see FIGS. 3(d) and 3(e)). An entire sequence of N bits is compressed into one code bit interval $t_c=(1/f_c)$. This sequence is hereafter referred to as the "local" code sequence. When each new master code bit is generated, it is loaded into the memory and the oldest bit in the memory is discarded. The relative position of each compressed bit within a real code bit period is advanced one position in each consecutive real code bit period; ergo, precession.

An address counter 6 is driven at a processing rate ($f_p$) and divides by a count of N the total number of local code bits in storage. Counter 6 is reset at the beginning of every real time code bit and thus provides an "address" to each bit period in the compressed code time domain. This address is represented by the binary number indicating state of the counter. A coincidence detector 7 compares the state of the address counter 6 with an address stored in an address selector 8. The address selector may be manually set or automatically activated, as will be decribed. When coincidence is achieved between the count of the address counter 6 and the address selector 8, a pulse is generated which is used to "strobe" or interrogate the memory 5, extracting the code bit which is being recirculated past the strobe point at that time. The code bits are extracted in real time, on a one-to-one basis with the incoming code stream bit with a fixed delay represented by the "address" delay (see FIG. 3(f)). A flip-flop 9 is provided at the output to reclock the strobed output code stream back into real code time by means of the master code rate sampling.

The apparatus of the invention may be used to achieve synchronization of a locally generated code and a received code by means of static correlation and dynamic correlation techniques.

Figure 5:
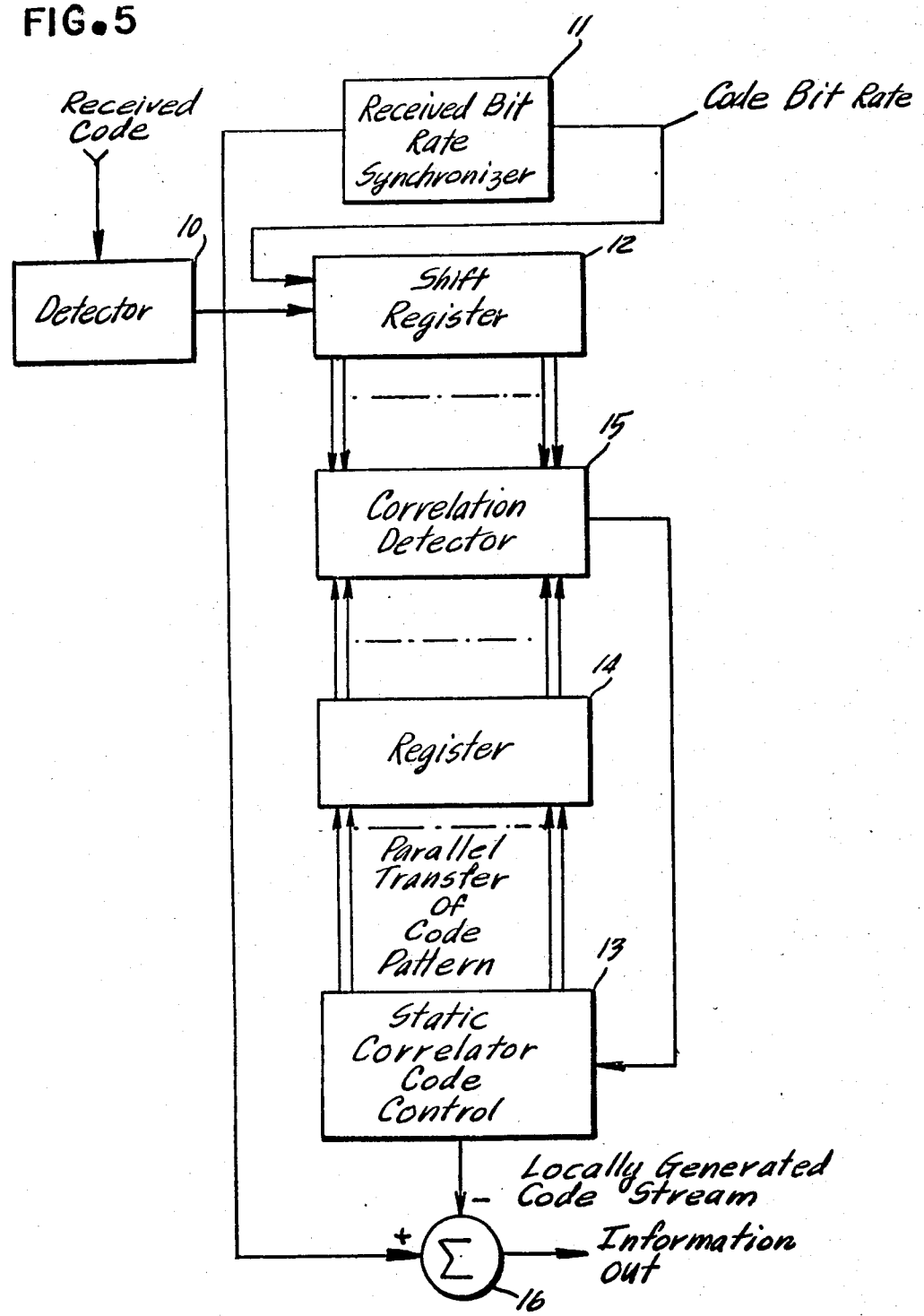
FIG. 5 shows a static correlator.

FIG. 5 shows a static correlator. A static correlator is defined as a device which uses a stored static code preload of a code sequence or element of a locally generated code (called a pattern) in anticipation of correlation with a received code stream. Upon correlation, the locally generated code stream is then dynamically generated in synchronization with the received code stream.

Initial correlation and synchronization acquistion are considered first, followed by consideration of fine synchronization (that of accounting for continuing clock drift or changes in propagation delay).

In a typical binary digital communication system, the received signal is detected or demodulated in a detector 10 (a process analogous to discrimination of an FM signal) and supplied to the steering inputs of a shift register 12. The detector output signal is also supplied to a received bit rate synchronizer 11 which examines the axis crossings of the incoming signal and extracts the bit rate of the received signal by techniques known to the art.

A static correlator code control 13 contains among other elements a master code and timing generator such as shown in FIG. 2. The code control when in a receive search mode, supplies "blocks" or segments of the locally generated code sequence (called a preamble) which are loaded in parallel into register 14 at the window rate $f_w$. This load is stored in register 14 for a period of 2 $T_w$, during which time a correlation detector 15 compares the static load in register 14 with a received load being shifted down shift register 12. When a predetermined level of agreement is reached between the states of registers 12 and 14, denoting "correlation" of the locally generated (and stored) code preamble, and the received code, a correlation pulse (also called address transfer pulse) is generated and fed to the static correlator code control 13 to cause 13 to change modes and commence dynamic generation of the local code in time synchronization with the received code. (It is understood that information is not transmitted during the synchronization interval). The locally generated code stream is subtracted from the received (and detected) signal at summer 16. Information will appear at the output of the summer 16 as soon as transmission of information commences at the transmitting end of the link.

In the event that correlation is not achieved in one period, 2 $T_w$, the static correlator code control supplies a new "pre-load" or "pattern" to register 14 of FIG. 5 for the next period, and so on throughout the time period allowed for synchronization.

Figure 6:
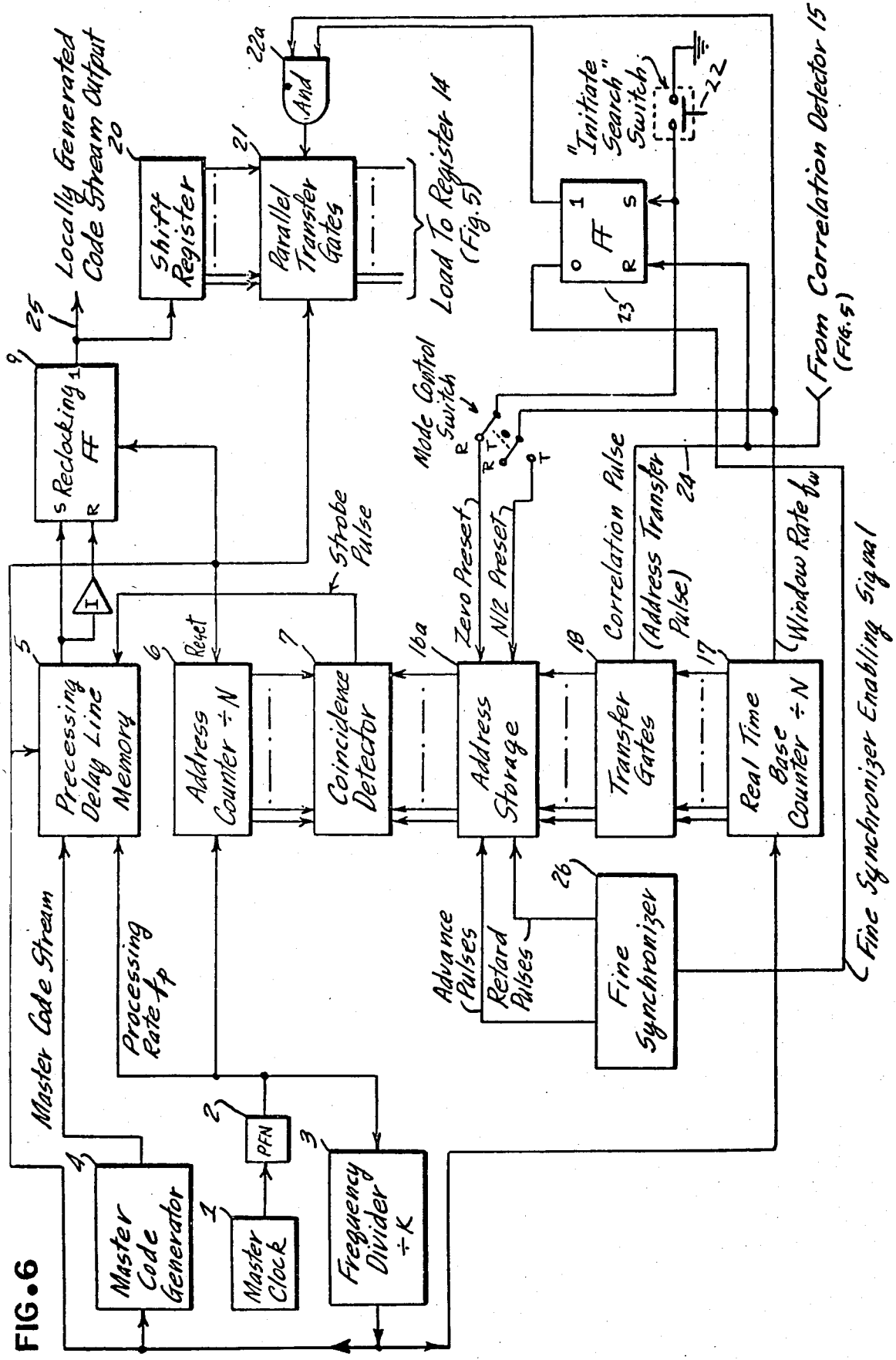
FIG. 6 shows an element of the static correlator of FIG. 5.

The static correlator code control 13 is shown in FIG. 6. Control 13 incorporates the elements of FIGS. 2 and 4 with an address storage register 16a substituted for address selector 8, and elements 17, 18, 19, 20, 21, 22a, 23, 24 and 26, the function of which will be explained presently. To operate a static correlator such as shown in FIG. 5, the receiver must anticipate in advance what pattern the transmitter will send. It must anticipate this pattern by a nominal period of $T_w$ and hold it for a period of $2 T_w$ to accommodate the uncertainty of $\pm T_w$. Since an anticipatory code (negative time domain) cannot be realized, the same effect is achieved by delaying the transmitted code by $T_w$.

The transmitted code sequence is derived by presetting the address storage register 16a of FIG. 6 to N/2, where N counts are equivalent to $2 T_w$ time delay. This is accomplished by connecting the source of window rate pulse ($f_w$) to an N/2 preset bus in the address storage register 16a when a receive-transmit mode control switch 19 is placed in the "transmit" or T mode.

The receive segment of the code used in the static correlator is transferred from a shift register 20 at the beginning of each window period to the static correlator shift register 14 of FIG. 5 by means of parallel transfer gates 21. When the mode control switch 19 is placed in a "receive" or R position, the transmit preset bus to address storage register 16a is disconnected and a receive search preset bus is enabled. This bus presets the address storage register to the "zero" address when the "initiate receiver search" pushbutton 22 is operated. Activation of this pushbutton also "sets" flip-flop 23 which controls the receive mode. In the set condition, the "receive switch" mode is enabled and in the reset state, the "receiver synchronized" mode is enabled.

In the receive search mode, the address storage register 16a is preset to zero as previously noted and AND gate 22a is enabled, allowing a window rate pulse to activate the transfer gates 21 at the end of each window period, causing parallel transfer of the new code segment to register 14 of FIG. 5 in the static correlator.

A real time base counter 17 essentially "tracks" this code segment through the memory, but in real time. When correlation is detected in the static correlator, a pulse is sent over a lead 24 to the flip-flop 23, resetting it. This pulse also enables transfer gates 18 which transfer the address stored at that instant in real time base counter 17 into address storage register 8. This provides the correct "tap" or strobe delay to read-out a locally generated code stream synchronous with the received code on an output lead 25.

Resetting of flip-flop 23 also enables a fine synchronizer 26.

Fine synchronization is maintained by providing the fine synchronizer advance or retard pulses into the address storage register 16a (which is implemented as a forward/backward counter), thus continually updating the address used to extract the code from the memory 5.

The resolution of the system thus far described is one code bit. This is easily improved to the desired fractional code bit by the addition of several registers to the forward/backward counters such that the advance-retard pulses are divided by some factor M before activating the basic address storage register 16a. The "state" of these added registers determines the sample point within a code bit duration for an additional fractional-bit-delay shift register added to the recirculating delay line memory readout. The additional reclocking of the locally generated code stream output will be described in detail in the following description of dynamic correlators.

A dynamic correlation system is defined as one wherein cross correlation of the received code and a locally generated code is achieved by "sliding" the locally generated code past the received code in the time domain and observing the degree or correlation. To achieve the "sliding" condition, the clock rate $f_c$ of the local signal must be offset by some $\Delta f_c$, the equivalent of which can be implemented by changing the bit length $t_c$ of each locally generated code bit by plus or minus $\Delta t_c$. The factor M (a positive integer) provides this increment where $\Delta t_c = (1/M)t_c$.

Figure 7:
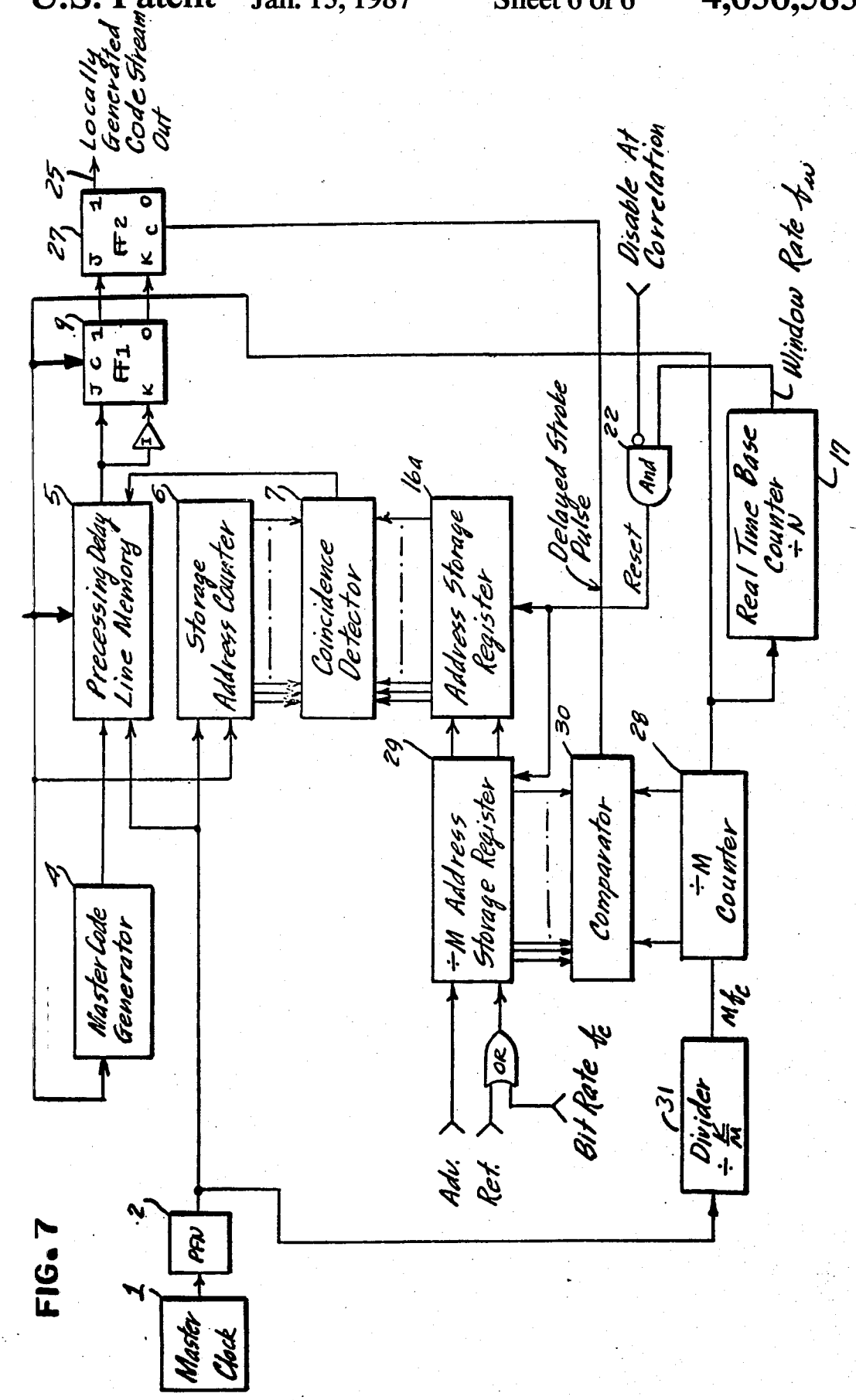
FIG. 7 shows a dynamic correlator.

The invention achieves a "sliding" function with the apparatus shown in FIG. 7. The circuit used to change the sample point of the code stream generated in the first reclocking flip-flop 9 consists of a divide-by-M counter 28, a divide-by-M address storage register 29, a comparator 30, and a second reclocking flip-flop 27. The divide-by-M counter 28 is integrated into the timing chain and provides the sampling time base. (To permit comparison with the static correlator system, a divider 31 is added providing a frequency division ratio of K/M such that the composite division ratio of divider 31 and divide-by-M counter 28 is K.) The counter of divide-by-M counter 28 is compared to the number of address stored in divide-by-M address storage register 29 and coincidence is detected every code bit by comparator 30 providing the sample point to strobe reclocking flip-flop 27. Since the bit rate ($f_c$) is connected to the retard bus of the forward-backward counter circuit of address storage register 29, the address changes each code bit period by the equivalent of one $M^{th}$ of a code bit. When M increments have transpired, the divide-by-M address storage register 29 transfers a count into the address storage register 16a selecting the next bit in the code sequence, but the sample point of reclocking flip-flop 27 is moved from one end of a code bit to the other end, yielding a continuous sequence of foreshortened (or lengthened) bits over the time domain of the memory. If correlation is not achieved during one "window"search, window rate $f_w$ from $\div N$ counter 17 is used to reset address storage registers 16a and 29 back to initial start point.

When code correlation is achieved in the receiver (not shown), the bit rate $f_c$ is disconnected from the divide-by-M address storage register 29 by an inhibit signal to an AND gate 22 and window rate $f_w$ is disconnected from the address storage register 16a reset bus. However, this circuitry can be used to advance or retard the timing of the locally generated code stream on output lead 25 by a fractional code bit length using fine synchronization techniques known to the art.

The invention provides a method for storing and accessing a large segment of an extremely long code stream with a minimum amount of circuit complexity. Use of a glass delay line in the precessing memory can significantly reduce power consumption over memory techniques employing active storage elements for each bit. Among the many novel features and advantages of the invention are:

(1) Multiple delays available by a simple change of preset.

(2) Use of parallel counters to maintain accurate control of processing time/real time relationship.

(3) A forward/backward real time counter is used to dynamically adjust code delay, in any selected large or small time increments.

(4) "Sliding" code delay by equivalent offset frequency by digital means of code bit length change.

What is claimed is:

1. In a communications network having a plurality of terminals each adapted to receive coded information signals, the improvement comprising means for synchronizing a locally generated code with a received code, said synchronizing means comprising:

means for detecting said received code, means for correlating said received code with said locally generated code, means for generating a correlation signal when said codes are correlated, means for generating said locally generated code in time synchronization with said received code in response to said correlation signal, said correlating means comprising search means for searching a period of bounded time uncertainty to determine the timing of said locally generated code, said search means comprising means for storing said received code, register means for storing blocks of said locally generated code related to said period of bounded time uncertainty, correlation detector means for generating said correlation signal when said received code and a block of said locally generated code attain a predetermined level of correlation, a master code generator for generating a master code, a precessing delay line for storing said master code in a compressed time domain, an address counter for providing an address to each master code bit period in said compressed time domain, an address storage register for storing a preset address related to said bounded time uncertainty, a coincidence detector for providing a readout pulse to said precessing delay line when the information in said address counter is coincident with the information in said address storage register, and a reclocking flipflop for reclocking information readout of said precessing delay line in real time to produce said locally generated code.

2. The apparatus of claim 1 and including;

shift register means connected to the output of said reclocking flipflop for storing blocks of said locally generated code, parallel transfer gate circuitry for transferring said blocks from said shift register to said register means, a real time base counter, and a plurality of transfer gates connected to transfer a count from said real time base counter to said address storage register in response to said correlation pulse.

3. The apparatus of claim 1 and including a forward-backward counter adapted to receive advance and retard pulses and having forward-backward output terminals connected to respective forwardbackward input terminals of said address storage register, whereby additions and subtractions may be made to the quantity stored in said address storage register, first divider means for dividing a master clock frequency $f_p$ to obtain a frequency $Mf_c$, a divide by M counter connected to divide the frequency $Mf_c$ and forward the resultant code bit rate frequency $f_c$ to respective input terminals of said master code generator, said precessing delay line memory, and said reclocking flipflop, a comparator having parallel connections to said forwardbackward counter and to said divide by M counter to generate a comparison pulse in response to predetermined counts in said counters, a second reclocking flipflop connected in tandem to the output terminals of said reclocking flipflop, means for forwarding said comparison pulse to an input of said second reclocking flipflop whereby the code bit output of said second reclocking flipflop is clocked to form said locally generated code, a real time base counter connected to divide the code bit rate frequency $f_c$ and furnish a frequency $f_c/N$ through an AND gate to respective reset terminals of said forward-backward counter and said address storage register, means for disabling said AND gate in response to said correlation signal, means for furnishing the code bit rate frequency $f_c$ to the retard input terminal of said forward-backward counter, and means for furnishing the frequency $f_p$ to said precessing delay line, said address storage counter and said divider.

* * * * *